United States Patent Office 3,611,490
Patented Oct. 12, 1971

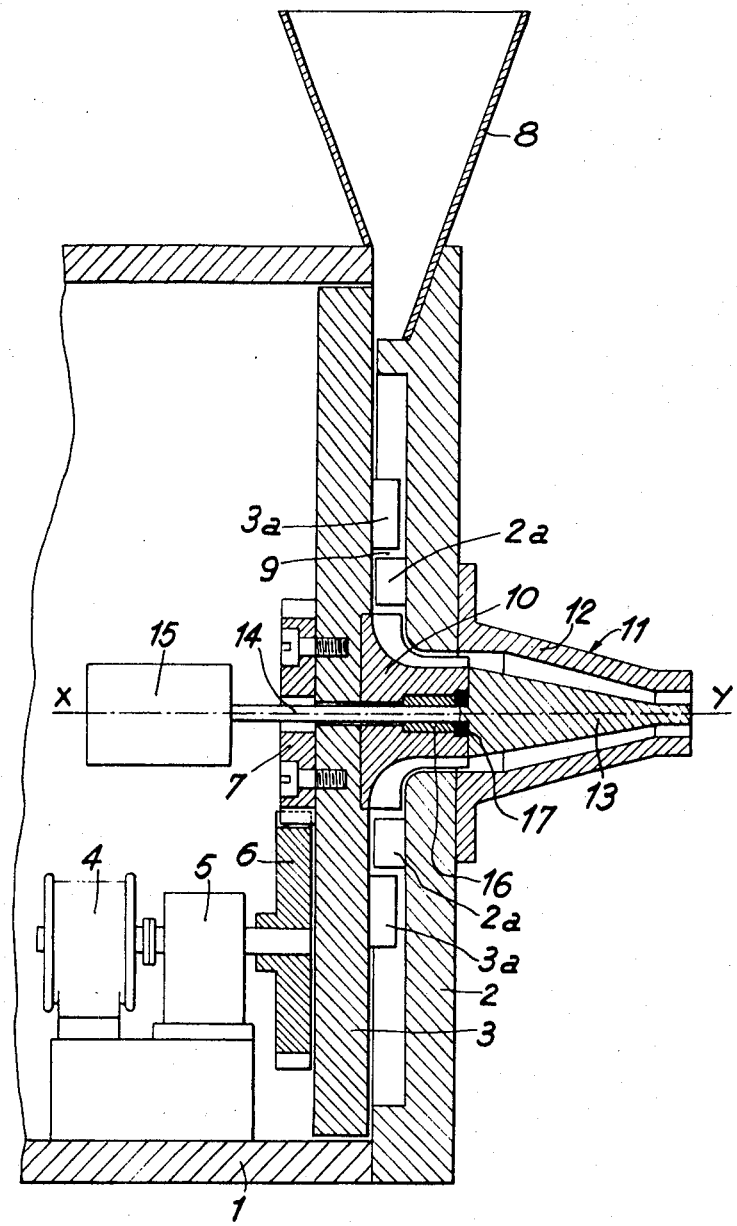

3,611,490
EXTRUSION DIE FOR FORMING TUBES
Bernard Neuville, Versailles, and Raoul Hess, Chatillon-sous-Bagneux, France, assignors to Sidel, Société Anonyme, Le Havre, France
Filed June 23, 1969, Ser. No. 835,329
Claims priority, application France, June 28, 1968, 157,109
Int. Cl. B29f *3/04, 3/06;* B29d *23/04*
U.S. Cl. 18—12 C
2 Claims

ABSTRACT OF THE DISCLOSURE

An extrusion die for forming tubular bodies from thermoplastic materials, which is mounted on a rotary plate extruder and comprises an external socket and an inner coaxial punch or core, characterized in that the die punch is held by a rod rigid therewith and extending through the rotary plate of the extruder, the axis of said rod being coincident with the plate axis.

---

This invention relates to die structures for forming plastic tubes and has specific reference to an improved die construction for forming tubular bodies and notably tubes, parisons or blown sheaths for films from plastic material stocks. The dies to which this invention refers more particularly are specially useful in extruders of the rotary plate type.

These rotary plate extruders comprise essentially a plate rotatably driven about its axis or centre so as to exert a shearing action upon the extrusion stock, between on the one hand one or both faces of said plate and on the other hand one or two parallel fixed surfaces parallel to said face or faces of the movable plate, the distance between the registering operating faces being a few millimeters. Whether these extruders are based on the so-called "normal power" or Weissenberg principle, or on the principle consisting simply in replacing the longitudinal feed screw of conventional machines with a flat screw disposed on the movable plate, the purpose of these extruders is to gellify and homogenize in the shortest possible time the plastic stock, due notably to its poor stability, in general, at its gelling temperature.

The operating characteristics of these machines are considerably inferior to those of conventional extruders. Firstly, when the output rates are properly adjusted and the apparatus fulfills entirely the function devolved thereto the plastic material attaining the centre of the plates about the member to be referred to hereinafter as the "nose-piece" which projects from the surface of the rotary plate towards the extrusion die is gelled completely. The centripetal motion imparted to the material to be extruded by the plate rotation is converted into a movement in a direction substantially parallel to the plate axis. Under these conditions the material assumes the shape of a hollow cylinder as it penetrates into the die and it is useless to transform this cylinder intermediately into a solid rod as generally observed in conventional extruders at the end of the feed screw.

Secondly, these extruders develop relatively low pressures, considerably lower than those obtained with conventional screws. The conventional die-mounting devices such as angle heads or straight heads of relatively great length which are currently used in screw-type extruders counteract the flow of plastic material at the cost of very high pressure losses and therefore the use of such devices should be avoided. In fact, it is known that the punch or core usually provided centrally of the die for shaping the inner surface of the extruded tubes is supported and held in position by suitably shaped spider arms whereby the punch and the die socket constitute a rigid assembly. Thus, the stock flows into the die around these spider arms and the separate streams thus formed merge again into one another downstream thereof. To permit this merging action the plastic stock must necessarily flow a certain distance within the die after passing these spider arms. Meeting this requirement obviously and compulsorily involves a substantial loss of pressure. In addition, the weld lines along which the separate streams have been joined again to one another subsist in all cases and constitute zones of incipient weakness developing either a minor resistance to the internal pressure likely to be exerted within the tube in actual service, and/or a tendency to burst the tube wall for example when blowing parisons or the like. If an angle head is used the punch is secured to the die socket by its rear portion. In this case a weld line develops likewise along one generatrix of the extruded products, with the same inconveniences as in the preceding case mentioned hereinabove. Moreover, the curvature of the lines formed in the material creates an additional loss of pressure.

It is therefore the chief object of the present invention to avoid these inconveniences.

To this end, the extrusion die for forming tubular bodies from thermoplastic materials, which is mounted on a rotary plate extruder and comprises an external socket and an inner coaxial punch or core, is characterized in that the die punch is held by a rod rigid therewith and extending through the rotary plate of the extruder, the axis of said rod being coincident with the plate axis.

The moderate thickness of the rotary plate of extruding machines of the plate type, compared with the length of the screws equipping conventional extruding machines, permits of easily adapting the object of this invention to these rotary plate extruding machines.

The rotary plate is driven through a roller or gear system acting upon the plate periphery, or through a gear or pulley system comprising one element concentric to said rotary plate.

In order to afford a clearer understanding of the subject matter of the invention, reference will now be made to the attached drawing illustrating diagrammatically by way of example a specific form of embodiment which however should be construed as limiting the scope of the invention.

The single figure of the attached drawing is a diagrammatic axial vertical section showing the die with its central punch or core and the extruder portion to which it is secured.

The extruder illustrated in the drawing comprises a main body or structure 1 incorporating a stator 2 and a rotor 3 registering with each other, the stator 2 consisting of a stationary vertical plate and the rotor 3 of a circular plate adapted to rotate about a horizontal axis *x–y*. The rotary plate 3 is rotatably driven from a motor 4 via a variable-speed gearing 5 and a train of gears consisting in this example of a pair of meshing pinions 6 and 7, pinion 7 being rigid with the rotary plate 3.

The fixed plate 2 and rotary plate 3 carry fixed vanes 2a and movable vanes 3a respectively for stirring the plastic material to be extruded.

A hopper 8 is mounted at the top of the main structure 1 for feeding stock to the gap 9 left between the two plates 2 and 3 where said stock is gelled and homogenized.

The rotary plate 3 carries a central concentric nose piece 10 projecting into a die 11 secured to the outer surface of the fixed plate 2. This die 11 comprises a peripheral element of revolution or socket 12. The internal element punch or core 13 of this die has a corresponding frustoconical and coaxial configuration and has secured to its rear end a coaxial rod 14 extending through said nose piece 10 and said rotary plate 3 along said axis *x–y*.

This rod 14 has its end opposite to said punch 13 connected either to the frame structure of the extruder 1, so as to be rigid therewith, or to a device 15 adapted to impart a rotational and/or axial movement to the punch 13. This last-named device 15 may comprise either gearing means for rotatably driving said punch 13 or a piston for imparting a movement of translation thereto, an alternate solution consisting for example in providing a screw adapted to impart a helical motion to the punch 13. However, these various fastening or driving means are well known to those conversant with the art and it is therefore not deemed necessary to illustrate them in detail in the drawing. In order to permit the relative movement of punch 13 and rod 14, a bushing 16 of suitable antifriction metal is fitted in a bore at the outer end of said nose piece 10 of rotor 3 for receiving the rod 14 therein. The fluid tightness between the bore receiving said rod 14 and the die 11 is preserved by using a packing 17 consisting advantageously of polyfluorized resin and having an annular or toric shape. The contact surfaces of nose piece 10 of rotor 2, on the one hand, and punch 13, on the other hand, are machined with a view to avoid any lost volume while permitting the frictionless sliding contact therebetween. If it is contemplated to impart a movement of translation or a reciprocating movement to the punch 13, the latter must be so adapted to nose piece 10 that these two members interfit and will thus prevent the gelled material from seeping therebetween.

According to the desired type of products the punch 13 may be either stationary or driven independently of the rotational movement of the rotary plate 3. During the continuous extrusion of tubular products, for example, the punch 13 remains preferably stationary. For extruding parisons to be subsequently blown for forming hollow bodies, it may be advantageous to cause the wall thickness of the parison to vary along the generatrix; in this case the movement of translation of the properly shaped punch 13 permits of obtaining a thickness varying according to a predetermined programme. Besides, in the case of combined extrusion and blowing of sheaths it is necessary, in order to ensure a proper winding of the resulting sheath, to have a constant thickness along all generatrices. To obtain a satisfactory homogeneity in this respect the thickness variations are distributed by causing the rotatation either of the wind-on spool or of the extruder itself. With the device of this invention very satisfactory results can be obtained by imparting a rotational motion to the extruded sheath at the desired speed while causing the rotation of the punch or core 13 alone, the extruder and winding system remaining stationary.

In order to illustrate the advantageous features characterizing the die according to this invention, two typical forms of embodiment of this die will now be described, but it will be readily understood that these examples should not be construed as limiting the scope of the invention, since many modifications and variations may be brought thereto without departing from the basic principle of the invention.

EXAMPLE 1

An extruder of the above-described type has a rotary plate 3 having a diameter of 180 mm. which is separated from a fixed plate 2 by a gap 9 ranging from 5 mm. at the periphery of the plates to 11 mm. in the central region surrounding the cylindro-conical nose piece 10. Two series of vanes comprising each four deflection vanes are disposed on said plate, the movable vanes being disposed externally with respect to the fixed one. Besides, the nose piece 10 carries three vanes. The base of punch 13 which engages the nose piece 10 has a 10-millimeter diameter. The other end is 21 mm. in diameter. The inner bore of socket 12 ranges from 42 mm. at the inner end to 25 mm. at the outer end. The length of punch 13 is 47 mm. The rotary plate 3 is driven at a speed of 65 r.p.m. and the plate temperature is 180° C. during the operation of the extruder. When this temperature is attained the apparatus is fed with PVC having a viscosity of 80 according to AFNOR French standards, K-value=57, this material being stabilized by reason of 1% by weight of tin thioglycolate calculated from the resin weight.

Thus a tube having a diameter of about 25 mm. and a thickness of about 2.5 mm. is extruded at the rate of 20 kg./hr. This tube is free of any traces of weld lines along its generatrices; it is homogeneous and translucent throughout its length. If compressed air is blown into this tube as it is extruded, it will expand to form a sheath capable of attaining a diameter of about 200 mm. without bursting.

If the die of this invention is replaced, on the same extruder, by a conventional die wherein the punch is held by four spider arms connecting same to the socket, the dimensions of the various die elements being otherwise unchanged, the output drops to .06 kg./hr. The weld lines along the four generatrices are clearly visible. Shortly after the admission of compressed air and before an appreciable swelling is produced, the tube is split along one of its generatrices.

EXAMPLE 2

A sheath-forming die having a socket whose outlet diameter is 25 millimeters is fitted to the same extruder as the one described in Example 1.

The extruder is fed with stock prepared under proper heating in a fast mixer, said stock comprising 100 parts b.w. of a PVC having an AFNOR viscosity =80, and 2.5 parts b.w. of a tin thioglycolate stabilizer.

The plate temperature is 190° C. and the die temperature 210° C. The rotor speed is 65 r.p.m.

The sheath extruded from the die is blown to a diameter of 80 mm. and then wound into a spool.

At the beginning of the test the die punch or core is stationary. The diameter of the bobbin formed by winding this sheath varies from one to the other edge, due to the variation in thickness of the sheath along a circumference.

Then, the punch is rotated at the rate of 2 r.p.m. The sheath itself rotates at a lower rate, of the order of 1 r.p.m. The wound sheath forms a regular bobbin or spool.

What we claim is:
1. Die for shaping tubular bodies from thermoplastic materials which comprises a fixed frame structure, a stationary circular plate having a hollowed central portion, a die connected at right angles to the hollowed central portion of said circular plate, a rotary circular plate also provided with a hollow central portion and revolving about a common axis in a plane parallel to said stationary plate in order to constitute therewith the space receiving the thermoplastic material, fins secured in alternate relationship to the registering faces of said stationary and rotary plates, respectively, a nozzle formed with an axial bore and secured to the centre of said rotary plate so as to open into said die, a shaping punch forming a coaxial extension of said nozzle in said die, a rod extending coaxially through the bore of said nozzle and adapted to actuate said punch, and means adapted to either impart to said rod a movement of translation and/or rotation, or to hold said rod against motion.

2. A die as set forth in claim 1, comprising means for sealing the space between said nozzle and said punch.

References Cited

UNITED STATES PATENTS 3,310,835  3/1967  Morozov et al. ____ 18—12 (C)
3,355,764  12/1967  Moyer _____ 18—30 (AF)

FOREIGN PATENTS 1,064,937  4/1967  Great Britain _____ 18—12 (C)

ROBERT L. SPICER, JR., Primary Examiner

U.S. Cl. X.R.

18—14 V.